June 14, 1932.  E. A. LEES  1,863,449
TOILET IMPLEMENT
Filed May 31, 1930

Everard A Lees
INVENTOR

BY Victor J. Evans
ATTORNEY

WITNESS:

Patented June 14, 1932

1,863,449

UNITED STATES PATENT OFFICE

EVERARD A. LEES, OF CENTRAL FALLS, RHODE ISLAND

TOILET IMPLEMENT

Application filed May 31, 1930. Serial No. 458,235.

The object of this invention is to provide, in connection with a razor blade and handle, a perforated or apertured shank for the blade, designed to serve as an implement for removing blackheads.

With the foregoing and other objects in view, the invention consists in the novel construction and arrangement of elements described and claimed, it being understood that modifications may be made within the scope of the claim, without departing from the spirit of the invention.

In the drawing forming part of this application

Figure 1:
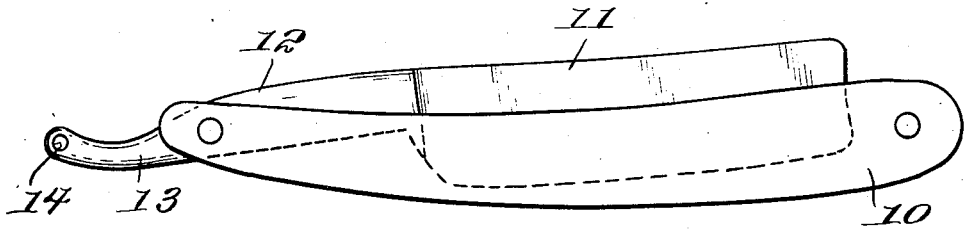
Figure 1 is a view of the implement in elevation, the blade being closed, and the shank projecting from the handle.
Figure 2:
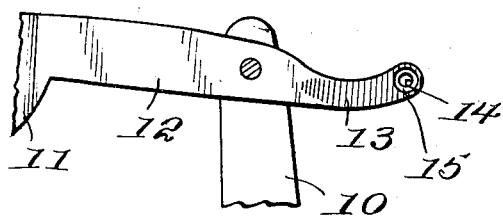
Figure 2 is a fragmentary view constituting a section through the pivot and the extreme end of the shank.
Figure 3:
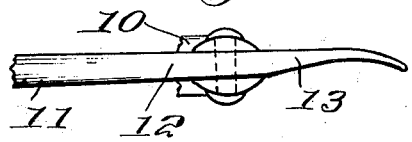
Figure 3 is a detail view showing the pivotal connection in plan, and the curvature of the shank.

The handle of a razor of standard type is designated 10, and the blade 11 is provided with a curved shank 12, the projecting end of which constitutes the shank of the article claimed as novel in the present case and under the conditions disclosed.

The projecting end 13 is provided with an aperture 14, near the extreme end, the edge portion of the walls of the aperture being angular or sharp on one side of the shank, and being reamed out on the other side, as shown at 15.

The apertured portion is of reduced thickness, as compared with the remainder of the shank, and one surface is ground sufficiently to produce a convex member, slightly turned as shown, and approaching the formation of a spoon.

Figure 5:
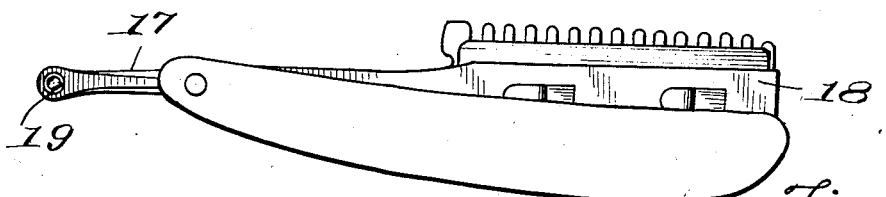
Figure 5 is in elevation, and shows the use of an apertured shank on the blade of a type of safety razor.
Figure 6:
Figure 6 is a detail view showing the structure at the end of the shank, in a modified form.
Figure 4:
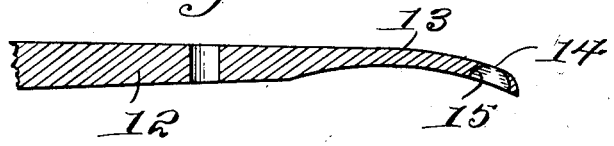
Figure 4 is a detail in section through the shank of the blade.

The same course may be followed in connection with the projecting end 17 of a blade holding device 18 of the form shown in Figure 5, which represents a commercial type of safety razor. In this instance, the aperture is designated 19, and a section would correspond with Figure 4, but the aperture may include one or more straight edges, say two at an angle and slightly diverging, adapting the device to pimples of different size. No sharp edge is exposed and single hairs adjacent to cuts or the like can be safely removed or severed by the protected but moderately sharp edge of the wall. The reamed out portion at 15 may approximate hollow grinding of the edges or edge portions around aperture 14.

What is claimed is:

A cuticle treating implement including a shank having an aperture in one portion thereof, the apertured portion being reamed out on one side of the shank and the opposite side of said shank having a convex surface portion, and angularly positioned walls within the aperture, said walls forming edges within the aperture.

In testimony whereof I affix my signature.

EVERARD A. LEES.